United States Patent Office 3,024,113
Patented Mar. 6, 1962

3,024,113
POULTRY PRODUCT AND METHOD
David Torr, Cheyney, Pa.
No Drawing. Filed May 6, 1960, Ser. No. 27,272
4 Claims. (Cl. 99—107)

The invention relates to a new and useful food product composed of poultry meats and poultry by-products and to a method of preparing such product.

Objects and advantages of the invention will be set forth in part hereinafter and in part will be obvious herefrom, or may be learned by practice with the invention, the same being realized and attained by means of the processes, steps and combinations pointed out in the appended claims.

The invention consists in the novel compositions, steps, processes, combinations and improvements herein described.

Objects of the invention include the production of an all-poultry food product free of adulterants or non-poultry fillers or binders, in which disintegrated particles of skin, giblets, hearts, livers, and other non-calcareous by-products etc. (hereinafter collectively called "by-products," because they are normally discarded or not used with the muscle meats of the fowl) are used to form an emulsion serving as a matrix to bind and incorporate large pieces of meat in a composite form. The product of the invention is in the form of a pre-cooked roll, loaf or the like, which retains its integrity at normal and room temperatures so that it can be sliced without disintegrating, crumbling or falling apart. Thus it is capable of being used efficiently for cold cuts, sandwiches and salads.

Another object of the invention is to produce a precooked emulsion or matrix for such a product, formed entirely of the poultry by-products, which when heated for serving, will melt down into a fluid forming a palatable and attractive sauce or juice-like material in which the large pieces of meat are immersed. In this respect the invention functions in marked contrast to products such as bologna in which the matrix material or "emulsion" tends to harden and solidify upon heating.

A further object of the invention is to provide a new and useful method for producing a product of the character described in which the segregation of gelatin and like materials during cooking or sterilization is avoided. In many prior types of pre-cooked or sterilized meat loaves, canned meats and the like, the cooking or sterilizing operation results in the production of a substantial amount of fluid gelatin and fat which, on cooling, forms an exterior layer on and about the product. This exterior layer of gelatin and fat is unattractive in appearance and in cases where the product is used for sandwiches and cold cuts, this layer must be removed, thereby increasing the cost of the product to the consumer. By the process of the invention, which includes the step of packing the loaf in cans or casings at a relatively high temperature after sterilization, the segregation and formation of such extraneous layers of gelatin, fat and the like is wholly avoided and these materials, to the extent that they exist in the product, remain inter-mixed in a homogeneous manner and are substantially wholly absorbed on and in the particles forming the matrix.

The use of the muscle meats of chicken and turkey as foods is, of course well known, and their uses include cooked products such as creamed chicken and turkey, chicken a la king, chicken and turkey pies, chicken croquettes, chicken salads, sandwiches and in many other ways. In recent years frozen chicken and turkey pies have made their appearance, along with other products based on the use of chicken meat such as chicken croquettes, sticks, etc. Within the past two or three years a number of turkey rolls have been placed on the market. In the case of the turkey roll, cooked or uncooked pieces of turkey meat have been placed in a casing under pressure, in some instances gelatin has been added as a binder, and these casings stuffed with turkey meat are frozen and are marketed in frozen form. Where the meat has been precooked and stuffed into a casing, the resultant product has been an all-meat, rather dry product, which, since it is composed of large pieces of meat, only held together by gelatin or other binder which is not an essential component of the product being prepared, and further held together by the casing surrounding the pieces of meat, necessitates the freezing of the turkey roll, which has to be marketed and sliced under refrigeration so as to prevent the disintegration of the roll when the temperature of the product rises above approximately 45° F. In addition, these presently marketed turkey rolls, because of the fact that only the muscle meats of the birds have been utilized, have resulted in a product calculated to demand a very high wholesale and retail price such as to keep the product in the luxury class in so far as meats are concerned. In order that these products may be utilized in the manufacture of frozen pies, for example, it is necessary for the manufacturer to formulate a sauce or gravy generally made of turkey broth or water to which flour, starch, seasoning is added, and to which sauce a small amount of meat is added, so as to make the whole economically practicable.

Furthermore, it is well known that purchaser of a "chicken sandwich" is usually served turkey meat, since the labor of boning turkey is no more than boning the smaller chicken, and the larger yield of meat from the turkey makes this practice an economic necessity.

It is therefore the purpose of this invention to produce a turkey or chicken product, in roll or other form, in such a way so as to place on the market a chicken or turkey product which will on an economic basis remove such products from the luxury class; thus to produce a product which will compete with such products as liverwurst, bologna, boiled ham, etc. The products of the invention will permit the manufacture of chicken and turkey pies, making it possible to eliminate the uses of flour, starch, etc. for sauces and gravies, and to substitute an emulsion made of the by-products of the bird such as giblets, skin, hearts, livers, etc. This emulsion acts as a binder for the pieces of meat. In the use of these products as cold cuts, for salads or for sandwiches, said binder permits the efficient slicing of these products at normal temperatures without falling apart, while, in the case of hot dishes such as chicken or turkey a la king, or creamed chicken or turkey, they may be marketed more economically and at the same time allow the producer to offer a pure poultry product, made solely of chicken or turkey meat together with a binder of chicken or turkey by-products.

Referring now in detail to a present preferred embodiment of the invention, the poultry may be purchased in parts, already cut up, and the by-products can also be obtained separately. If desired, the whole bird may be used, in which case the entire bird should be eviscerated and ready for cooking.

Preferably the fresh product is cooked in a minimum amount of water at temperatures ranging from 160° F. to 185° F., and dependent on the batch size and the type of bird used, from 30 minutes to 1½ hours. Preferably a batch cooker with stirring arms will be used. It may be found to be satisfactory to cook the fresh product at even higher temperatures in water, steam, in an oven or by pressure steam cooking, by the use of infra-red lamps or high frequency apparatus, or cooked in any other way so as to make more simple the removal of the meat from the carcass. In some cases the natural juices of the birds will furnish sufficient moisture for lubricating the movement of a cooker mixer, where used, without the addition of any water.

After cooking, the boning may be done by hand or by machine. When the cooking has proceeded to a state whereby the meat may be readily freed from the carcasses, then the skin is first removed and placed in a container for such purpose together with the other poultry by-products to be used in the manufacturing of the emulsion which is composed of these by-products.

The boned-out cooked meat pieces are held in a cooler while the cooked skin, giblets, hearts, and any other edible non-calcareous by-products are first run through a standard meat grinder using a ⅛" plate once or twice depending on the desired product. This initially ground product is then preferably placed in a mechanical emulsifier such as the "Puc" mill, "Mince Master" or Fitzpatrick hammer mill and finally in a colloidal mill such as the "Premier," "Morehouse," "Manton Gaulin" or other machine of this type. Since a minimum amount of liquid is used in cooking, the liquid, gelatin and like materials formed during cooking are readily absorbed and held by the large surface areas provided by the size reduction of the disintegrated particles of the by-products.

The product thus obtained is a smooth emulsion which is admixed in any desired ratio with the pieces of meat heretofore set aside. A preferred mix is one-half meat pieces and one-half emulsion. This mixture is then reheated to at least approximately 120° F. and preferably to a temperature sufficient for pasteurization, preferably about 165° F. The heated mixture, while still hot is then placed in a flexible casing or into a can or other sterile container and allowed to cool. It is observed that when cooled there is no segregation or external layering of gelatin, fat or the like, the product being homogeneous throughout except for the interspersed solid pieces of meat. The filled casing, can or container is itself not heated during or after the stuffing operation. Upon cooling the emulsion provides excellent binding for the pieces of meat, permitting this finished combined product to be sliced easily at normal temperatures. In other words, refrigeration is not required to preserve the integrity of the roll or loaf for slicing and the slices remain firm and solid in use.

In the case of hot dishes it is only necessary to place the frozen, refrigerated or thawed product in a suitable cooking vessel, whereupon the emulsion, being thermoplastic in nature, will melt down into a thick smooth fluid sauce, freeing the pieces of meat. In the event that the resultant dish desired is similar to a creamed chicken a la king, it may be desirable to first pass the entire product through a standard meat grinder using a 1" plate so as to produce bite-sized pieces of meat.

I have found that in the final stage of emulsification of the by-products, that by varying the clearance between the rotor and stator, or in the case of the use of a high speed hammer miller using very fine screens, that I may produce an emulsion ranging in smoothness from fibrous to a buttery or creamy textured product. While all of the emulsion constituents of the final product will, upon heating, fall away from the pieces of meat, yet I find that the buttery textured product when heated frees the pieces of meat more quickly and also results in a smoother more satisfactory material for further treatment. If too fibrous the fibers interlock making difficult the freeing of the pieces of meat.

In order to produce a tasty and economical chicken or turkey a la king, for example, it is only necessary to admix and heat one part of the herein described product with one or more parts of cream of mushroom soup to produce an excellent hot dish, such as chicken a la king or creamed chicken or turkey. In the case of chicken and turkey frozen pies, a pie of both economical and of excellent quality may be produced by using this product, possibly with a higher proportion of poultry by-product to poultry meat, the by-product emulsion forming the base for such a quality frozen pie but permitting the use of a label reading "all poultry products" without requiring the use of flour, starches, or other standard fillers. In the same way it is possible to produce a poultry roll or loaf in sandwich size so as to make feasible the serving of a chicken or turkey sandwich for less than or even one-half the usual price charged for an all-meat chicken or turkey sandwich, and whereby the consumer will receive a sandwich filler largely composed of pieces of meat.

The invention in its broader aspects is not limited to the specific compositions, processes and steps shown and described but departures may be made therefrom within the scope of the accompanying claims without departing from the principles of the invention and without sacrificing its chief advantages.

What is claimed is:

1. The method of producing an edible poultry product which comprises the steps of reducing the size of particles selected from the group consisting of poultry skin, giblets, other non-calcareous by-products and mixtures of the foregoing to form a creamy emulsion, mixing pieces of poultry meat with said emulsion, raising the temperature of the mixture to render the emulsion thermoplastic, packing the mixture in a container, cooling the mixture below said temperature at which the emulsion is thermoplastic, to thereby bind the pieces of poultry meat to the emulsion, and to form a loaf which retains its integrity at normal temperature and which is capable of being sliced into integral slices when at normal temperatures.

2. The process of claim 1 wherein the temperature of said mixture is raised to at least approximately 120° F.

3. A food product comprising a cooked mixture of pieces of poultry meat interspersed in a binder comprising a matrix of emulsified particles selected from the group consisting of poultry skin, giblets, other non-calcareous by-products and mixtures of the foregoing, said matrix having incorporated therein liquid formed during cooking of the poultry material, said liquid being dispersed among and substantially wholly adsorbed by the emulsified particles of the matrix, said product being integral and capable of being sliced into integral slices when at normal temperatures, and said emulsion being thermoplastic and fusible to a liquid sauce when the product is heated substantially above room temperature.

4. The method of claim 1 wherein said member and said pieces of poultry meat are cooked.

References Cited in the file of this patent

UNITED STATES PATENTS

| | | |
|---|---|---|
| 2,622,028 | Torr | Dec. 16, 1952 |
| 2,622,029 | Torr | Dec. 16, 1952 |
| 2,640,779 | George | June 2, 1953 |
| 2,808,335 | Pierce | Oct. 1, 1957 |